(12) United States Patent
Ginsburg et al.

(10) Patent No.: US 7,399,699 B2
(45) Date of Patent: Jul. 15, 2008

(54) ON-DIE REFLECTANCE ARRANGEMENTS (75) Inventors: Eyal Ginsburg, Tel-Aviv (IL); Michael Kozhukh, Palo Alto, CA (US); Alexander Talalaevsky, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/073,143

(22) Filed: Mar. 4, 2005
(Under 37 CFR 1.47)

(65) Prior Publication Data

US 2005/0172186 A1 Aug. 4, 2005

Related U.S. Application Data

(62) Division of application No. 10/448,408, filed on May 30, 2003, now abandoned.

(51) Int. Cl.
*H01L 21/4763* (2006.01)
(52) U.S. Cl. .................. 438/626; 438/627; 438/631
(58) Field of Classification Search ............... 438/23, 438/24, 26, 626
See application file for complete search history.

(56) References Cited

U.S. PATENT DOCUMENTS

| 4,345,176 A | 8/1982 | Grudkowski et al. |
| 6,274,499 B1 * | 8/2001 | Gupta et al. ............ 438/692 |
| 6,300,241 B1 | 10/2001 | Moore et al. |

* cited by examiner

*Primary Examiner*—Long Pham
(74) *Attorney, Agent, or Firm*—Blakely, Sokoloff, Taylor & Zafman LLP (57) ABSTRACT

Improved semiconductor reflectance arrangements (e.g., semiconductor devices, systems including semiconductor devices, methods, etc.).

10 Claims, 6 Drawing Sheets

ON-DIE REFLECTANCE ARRANGEMENTS

This is a Divisional application of Ser. No. 10/448,408 filed May 30, 2003, which is presently pending.

FIELD

The present disclosure relates to improvements for on-die reflectance arrangements (e.g., including semiconductor devices, semiconductor packages, systems including the same, methods, etc.).

BACKGROUND

There is a drive toward achieving high quality on-die integration between metal oxide semiconductor (MOS) and ones of liquid crystal on silicon (LCOS), micro-electro mechanical systems (MEMS) and SLM (Spatial Light Modulators) technologies, and there is also a drive toward achieving optical devices using standard MOS technology. Some applications (e.g., optical applications) of LCOS, MEMS or SLM may require high reflectance areas (e.g., pixel mirrors) to be formed on a die. Improved reflectance arrangements are desired, and further, it is desirable that improvements be achievable using existing MOS technology, tools and methods, in order to maintain costs within reasonable levels.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims.

The following represents brief descriptions of the drawings, wherein:

FIG. 15 illustrates a magnified view of an example disadvantageous pixel hole resultant from the FIG. 13 disadvantageous arrangement, whereas

DETAILED DESCRIPTION

Before beginning a detailed description of the subject invention, mention of the following is in order. When appropriate, like reference numerals and characters may be used to designate identical, corresponding or similar components in differing FIG. drawings. Further, in the detailed description to follow, example sizes/values/materials may be given, although the present invention is not limited to the same. As manufacturing techniques (e.g., photolithography) mature over time, it is expected that devices, apparatus, etc., of smaller size could be manufactured. Well known power/ground connections to IC devices, ICs and other components may not be shown within the FIGS. for simplicity of illustration and discussion, and so as not to obscure the invention. Further, arrangements may be shown in simplistic and/or block diagram form in order to avoid obscuring the invention, and also in view of the fact that specifics with respect to implementation are highly dependent upon the platform within which the present invention is to be implemented, i.e., such specifics should be well within purview of one skilled in the art. Where specific details (e.g., process flows) are set forth in order to describe example embodiments of the invention, it should be apparent to one skilled in the art that the invention can be practiced without, or with variation of, these specific details.

Although example embodiments of the present invention will be described using example highly reflective pixel/mirrors that are provided, for example, for a MOS/LCOS arrangement using MOS technology, practice of the invention is not limited thereto. That is, the invention may be able to be practiced with other types of reflectance arrangements (e.g., non-pixel mirrors, heat reflectance), and for/with other types of technologies (e.g., MEMS, SLM).

Figure 1:
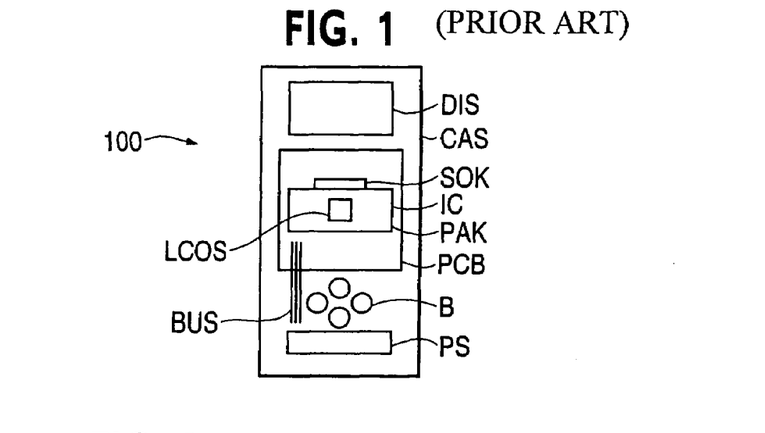
FIG. 1 illustrates example die, IC and/or electronic system arrangements that may incorporate implementations of the present invention.

FIG. 1 illustrates example die, IC and/or electronic system arrangements that may incorporate implementations of the present invention. More particularly, shown is a die or integrated circuit (IC) chip that may incorporate one or more implementations of the present invention as a lower level die or IC chip system. As one example, an implementation of the present invention may be highly reflective pixel/mirrors of an LCOS display that is formed on the die or IC. Such die or IC may be part of an electronic package PAK that incorporates the IC together with supportive components onto a substrate such as a printed circuit board (PCB) as a packaged system. The packaged system may be mounted, for example, via a socket SOK onto a system board (e.g., a motherboard system). The system board may be part of an overall electronic device (e.g., computer, electronic consumer device, server, communication equipment) system 100 that may also include one or more of the following items: input (e.g., user) buttons B, an output (e.g., display DIS), a bus or bus portion BUS, a power supply arrangement PS, and a case CAS (e.g., plastic or metal chassis).

Figure 2:
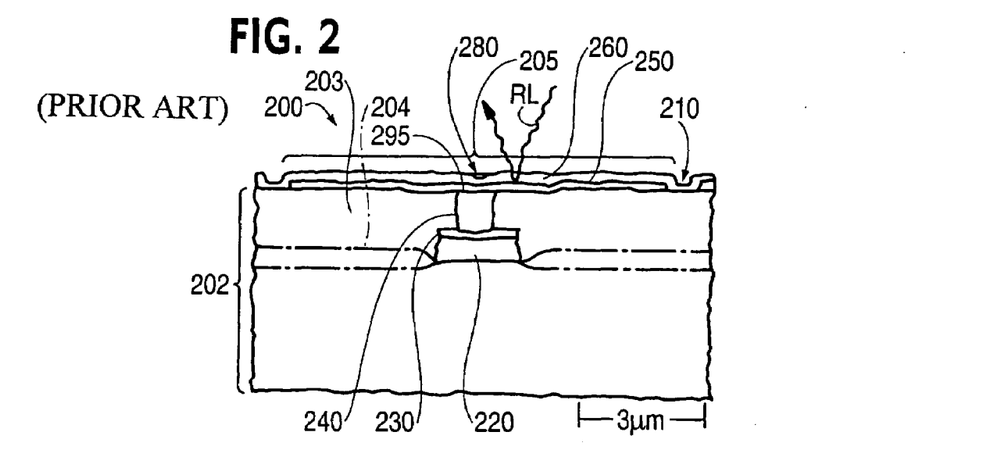
FIG. 2 shows a close-up cross-sectional view of an example pixel/mirror arrangement, such view being useful in gaining a more thorough understanding/appreciation of the present invention.

FIG. 2 shows (together with an example dimensional scale) a close-up cross-sectional view 200 of one example pixel/mirror arrangement, such view being useful in gaining a more thorough understanding/appreciation of the present invention. The example pixel/mirror arrangement may be formed on a substrate that may be topped with a plurality 202 of inter-layer dielectric (ILD) layers that may include a top ILD layer 203, and may have various structures 204 embedded therein. Further included may be a pixel metal interconnection 220, topped with an interfacing layer 230 and a via-filled plug 240 (e.g., a tungsten plug). A reflective layer (e.g., aluminum) 250 may be deposited onto the substrate and have patterned trenches 210 etched therein so as to form desired (e.g., substantially square) pixel mirrors 205. Multiple additional layers 260 (e.g., of SiO2, Si3N4) may be disposed onto the patterned reflective layer 250 as a reflective enhancement coating (REC) for enhancement, passivation and/or protection of the layer 250. Item 280 represents a pixel hole (discussed further ahead), item 295 represents an upper plug surface (discussed further ahead) and RL represents a reflected light.

Figure 3:
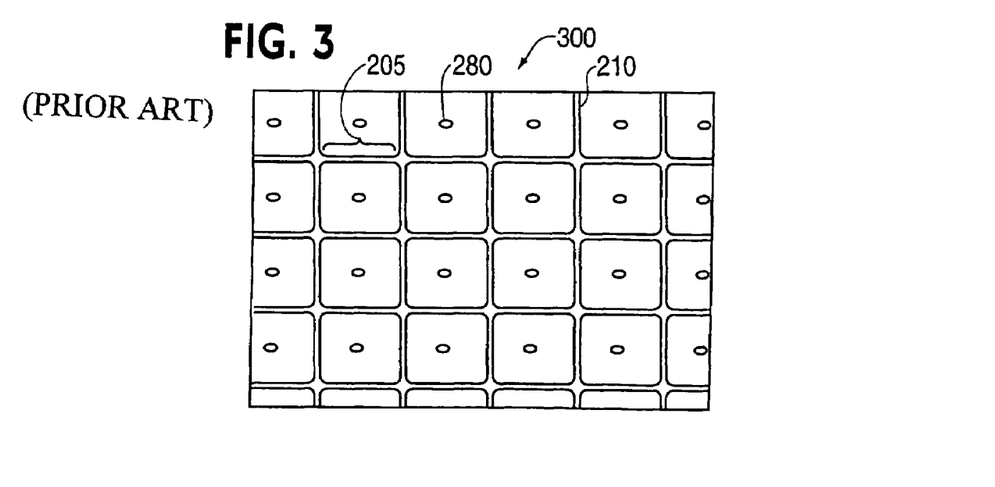
FIGS. 3 and 4 show example plan views of a plurality of pixel mirrors arranged in an example regular array, such views being useful in gaining a more thorough understanding/appreciation of the present invention.

FIG. 3 shows an example plan view 300 of a plurality of pixel mirrors 205 arranged in an example regular array. It is desired that reflected light (RL; FIG. 2) from any single particular pixel mirror 205 be substantially uniform in reflectance all across an area of that pixel mirror 205. Also, it is desired that reflected light (FIG. 3) be substantially uniform in reflectance from pixel mirror to pixel mirror 205 across the area of the entire array. Any differentials in reflectance within a given pixel mirror or across the array may be distractive to an end user (e.g., a consumer), and may render any device having the non-uniformity of reflectance both visibly and commercially unattractive to consumers.

A pixel hole 280 may represent a distortion that may show up in the reflective layer 250 and/or layers 203, due to distortions (non-planarities) that permeate upwards from an underlying plug structure. That is, any over-etching of a via fill material (e.g., tungsten) during an etch-back to achieve plugs within vias, may lead to a disadvantageous plug topography called "plug recess". That is, an upper plug surface 295 (FIG. 2) may be recessed below a general plane level of the ILD surface. While traditional MOS technology may not be sensitive to such "plug recess" topography, LCOS is. Such recess may permeate upwards and ultimately showing up as a discontinuity, and thus a change in reflectance, in the reflective layer 250 and/or layers 260. More particularly, thin Aluminum pixels will follow ILD/recessed-plug topography, to result in the "pixel hole defect".

Figure 4:
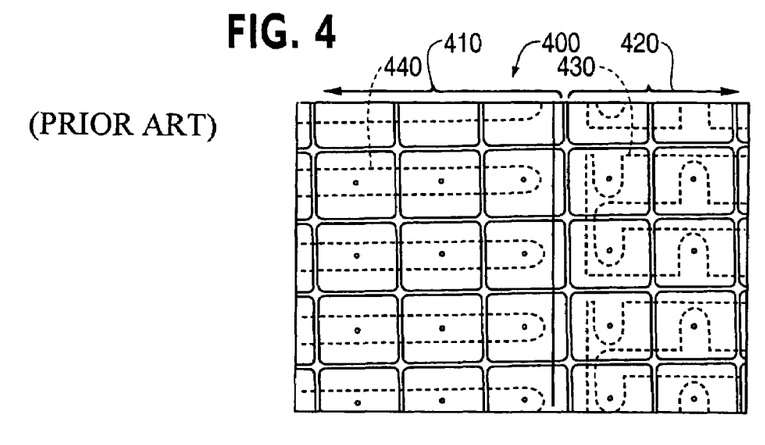

In the attempted construction of a die or IC having the aforementioned FIG. 3 pixel mirror array, additional non-uniformities of reflectance were encountered (beyond pixel hole defects). More particularly, FIG. 4 shows an example plan view 400 of a plurality of pixel mirrors arranged in an example regular array, but with such pixel mirrors and/or array being afflicted by multiple occurrences of non-uniform reflectance. More specifically, as to the overall array, a left-hand portion 410 was found to display a first pattern/level of reflectance, whereas a right-hand portion 420 was found to display a second (differing) pattern/level of reflectance. As to any given pixel, non-uniform reflectance also occurred within the boundary of the pixel mirror.

Upon investigation, it was found that various raised ridges and/or lowered valleys (with defined ridgelines 430, 440 therebetween; FIG. 4) had disadvantageously formed in regular patterns into the reflective layer 250 and/or layers 260. That is, a first type of ridgeline pattern 430 had formed in the right-hand portion 420, whereas a second type of ridgeline pattern 440 had formed in the left-hand portion 410. Further investigation revealed that the various raised ridges and/or lowered valleys, as well as the ridgeline patterns 430, 440 represented topographical artifacts caused by underlying structures/stresses permeating upwards and ultimately showing up in the reflective layer 250 and/or layers 260.

Figure 5:
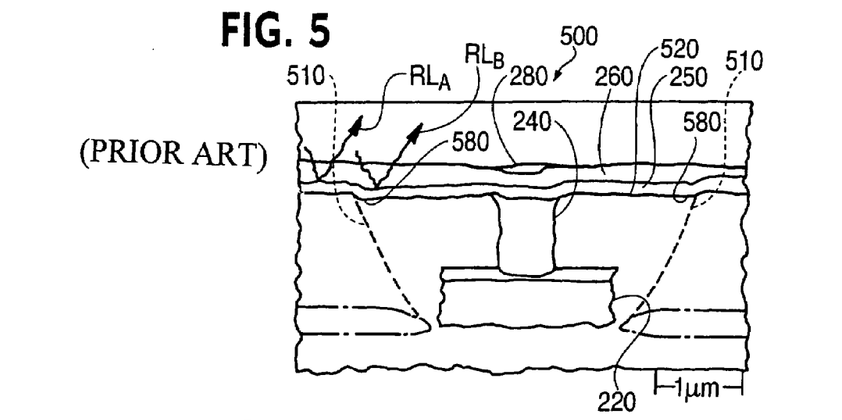
FIG. 5 represents a magnified cross-sectional view of pixel mirror areas adjacent to an underlying pixel metal interconnection and plug, such views being useful in gaining a more thorough understanding/appreciation of the present invention.

For explanation, FIG. 5 (together with an example dimensional scale) represents a magnified cross-sectional view 500 of pixel mirror areas adjacent to the underlying pixel metal interconnection 220 and plug 240. The FIG. 5 description that follows focuses on issues concerning stress lines emanating from underlying pixel metal interconnection 220 and resulting in artifacts (e.g., ridgelines) within upper layers.

During manufacturing, the underlying pixel metal interconnection 220 may be formed, for example, by deposition of a metal layer, followed by an etching (e.g., dry plasma etching) of the metal layer into desired interconnections. Such etched metal interconnections 220 may have a sharp topography (e.g., sharp edges). After interconnection 220 formation, one or more ILD layers may be deposited (e.g., via tetraethylorthosilicate (TEOS); plasma TEOS (PTEOS), thick TEOS, chemical vapor deposition (CVD), plasma enhanced CVD (PECVD)) for dielectric coverage (entombing) of the etched metal interconnections 220.

Through further analysis, it was found that stress lines 510 may emanate from ones of the underlying structures (interconnections 220) due to, for example, its prior sharp topography, and may emanate upwards through the ILD layers towards the surface thereof. After ILD deposition, chemical mechanical polishing (CMP) may be used to planarize the ILD surface. Although planarization may be temporarily achieved, such planarization does not eliminate the presence of stress lines 510. That is, the ILD layer has a residual poly stress structure. It was found that such local stress lines 510 may lead to subsequent surface alteration (non-planarization) of the ILD surface during subsequent production steps.

More particularly, after CMP planarization, the ILD may be further etched (e.g., via dry etching) to form vertical vias, and then a plug material layer (e.g., tungsten) may be deposited onto the ILD surface to fill the vias. Subsequently, the deposited plug material layer may be etched back from the ILD surface so as to leave plug material only within the vias. It was found that such etch back operation may lead to the aforementioned surface alteration (non-planarization) of the ILD surface.

Such happens because of the pre-existing non-homogeneous stress within the ILD layer. That is, CMP planarizes the ILD surface, but doesn't change the stress. As a result, the ILD was found to experience differing local etch rates at differing ILD areas having differing stress levels. More particularly, viewing FIG. 5 again, each stress line 510 may be viewed as dividing an ILD area into two ILD areas having differing stresses, i.e., an ILD area on a plug-facing-side of the stress line 510, and an ILD area on a non-plug-facing side.

ILD areas on a plug-facing-side of the stress line 510 may have a stress level which results in a high local etch rate of these areas, while (in contrast) ILD areas on the other (nonplug-facing) side of the stress line 510 may have a differing stress level which results in a lower local etch rate of these areas. ILD areas experiencing high local etch rates may result in etched valleys in the ILD surface, whereas ILD areas experiencing low local etch rates may be maintained as raised hills.

Borders between these valleys and hills represent topography steps 580, which may subsequently result in the aforementioned (FIG. 4) ridgeline artifacts 430, 440. As a result, any blanket plasma etching during etch back may destroy ILD planarity (i.e., surface flatness). As on example, an afflicted ILD layer prior to pixel deposition may have topography steps 580 ranging from tens to hundreds of Angstroms (prior to reflective layer 250 deposition). An overall result is that a non-planar ILD surface 520 occurs.

While traditional MOS technology may not be sensitive to such topography, LCOS, for example, is. That is, a thin reflective layer (e.g., Al/Cu) 250 deposited onto the non-planar ILD surface will follow ILD topography, and thus reflectance will vary at differing areas of the layer 250. For example, FIG. 5 shows (in representative form) a first type of reflected light RLA occurring at one area of the pixel arrangement, and a differing type of reflected light RLB occurring at a differing area of the pixel arrangement. That is, reflective layer 250 topography and thus reflected light may contain artifacts from underlying structures, for example, metal line structures. In fact, it was determined that FIG. 4's right-hand ridgeline pattern 430 and left-hand ridgeline pattern 440 represented differing topographical artifacts from two differing types of embedded metal line structures under the right-hand portion 420 and left-hand portion 410, respectively.

Accordingly, the present invention is directed toward improvements for preventing reflective layer topography from being affected by underlying structures, and further, is directed to improvements for enhancing reflectance of a reflective layer. The present disclosure teaches a number of differing embodiments which are now discussed as follows under differing sub-titles.

Figure 6:
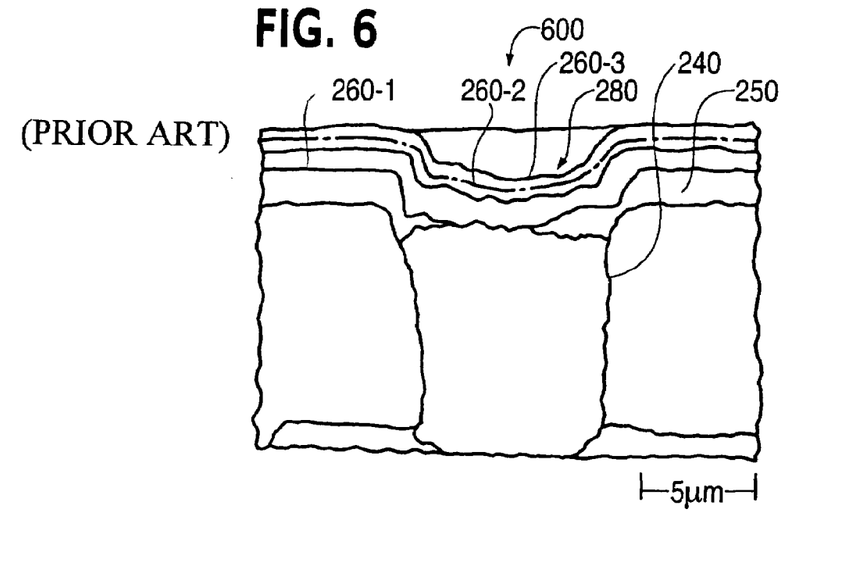
FIGS. 6 and 8 illustrate a disadvantageous arrangement for comparison purposes with FIGS. 7 and 9 showing an example first embodiment of the present invention, with all such FIGS. including magnified cross-sectional views of pixel mirror areas adjacent to an underlying plug.

Titanium Interfacing Layer:

For explanation, FIG. 6 (together with the indicated dimensional scale) represents a disadvantageous arrangement 600 (for comparison purposes with FIG. 7) and includes a magnified cross-sectional view of pixel mirror areas adjacent to the underlying plug 240. In formation of a reflective layer onto the ILD-layers of the substrate, a reflective (e.g., an Al/Cu pixel) layer 250 (e.g., 145 nm) is deposited, then patterned (e.g., via etching), and REC layers 260 are further added for enhancement, passivation and/or protection. In the present disadvantageous arrangement, at least three REC layers are added, i.e., an SiO$_2$ layer (260-1; e.g., 45 nm), a first Si$_3$N$_4$ layer (260-2; e.g., 95 nm) and a second Si$_3$N$_4$ layer (260-3; e.g., 65 nm), e.g., deposited via CVD deposition. (Note that a thin long-/short-dash line is used between the layers 260-2 and 260-3, to represent that such were deposited as separate layers, albeit made of the same material.) Item 280 again represents a pixel hole.

Figure 8:
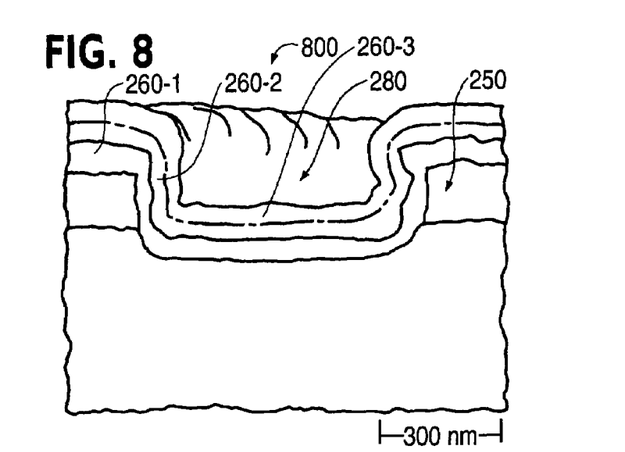

FIG. 8 (together with the indicated dimensional scale) shows a further magnified cross-sectional view 800 of a portion of FIG. 6, for the purpose of adding further clarity. With the FIG. 6/8 disadvantageous arrangement, reliability is problematic as such arrangement (although not shown in such magnified views) is afflicted with the aforementioned stress line emanation and reflective layer artifacts.

A left-hand column of the following Table 1 lists the above-discussed example processing flow for the FIG. 6 disadvantageous arrangement, while a right-hand column lists an example processing flow for an example first advantageous embodiment. (Bolded text may be used to highlight some important differences between the two.)

TABLE 1

| Disadvantageous Arrangement LCOS Processes: | Present Embodiment LCOS Processes: |
|---|---|
| Pixel high reflective metal deposition. Al/Cu | Pixel high reflective metal deposition: Thin Ti and Al/Cu |
| Pixel patterning. | Pixel patterning. |
| REC (Reflective Enhancement Coating) - 3 layer stack:: SiO$_2$ CVD deposition Si$_3$N$_4$ CVD deposition Si$_3$N$_4$ CVD deposition | REC (Reflective Enhancement Coating) - 2 layer stack: SiO$_2$ CVD deposition Si$_3$N$_4$ CVD deposition |
| Reliability check - Non-uniform Reflectivity | Reliability check - Uniform and Enhanced Reflectivity |

Figure 7:
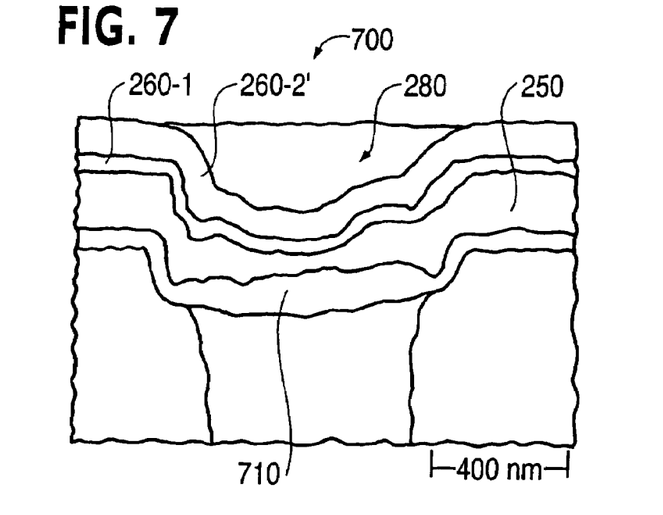
Figure 9:
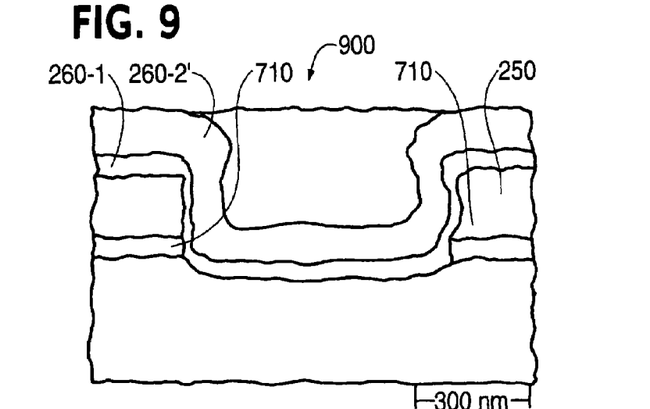

FIGS. 7 and 9 (together with the indicated dimensional scales) represent example views 700, 900 of an example advantageous embodiment in accordance with the above Table 1 right-hand processing flow. Unnecessary/redundant discussion of ones of listed processes/features which may be familiar to those skilled in the art, or which may have been previously discussed, may be omitted for sake of brevity. That is, the following discussion tends to focus on the differences from the disadvantageous embodiment, and/or important processes/features of the present embodiment.

In formation of a reflective layer onto the ILD-layers of the substrate, a titanium (Ti) interfacing layer 710 (e.g., 45 nm) is first disposed between a substrate and upper (e.g., Al/Cu) reflective layer portions. An upper reflective (e.g., an Al/Cu pixel) layer 250 (e.g., 145 nm) is deposited, then patterned (e.g., via etching). The Ti and Al/Cu reflective layer may be deposited using a single process. (An intervening insulation layer or insulation area (e.g., SiO$_2$) may also be provided as an electrical isolator in appropriate areas if electrical isolation is required between any of the conductive Ti or Al/Cu layers and any plug.)

Use of the new Ti and Al/Cu reflective double layer may be accomplished with negligible additional cost and existing MOS technology/tools, yet adds significantly improved reliability success. That is, the thin Ti layer was chosen as an under-layer to the Al/Cu layer for improved Al/Cu adhesion to the underlying ILD, and also for improved step coverage, which is critical to reliability. The Ti layer helps lessen/avoid the aforementioned differing stress line etch rates and/or emanation of artifacts into the subsequent Al/Cu layer, so as to result in a more uniform pixel and/or array reflectance such as that shown in FIG. 3 (as opposed to FIG. 4).

Again, REC layers 260 may be added for enhancement, passivation and/or protection. In the present advantageous arrangement, two REC layers (as opposed to three) are added, e.g., a SiO$_2$ layer (260-1; e.g., 45 nm) and a Si$_3$N$_4$ layer (260-2; e.g., 95 nm). These layers may be deposited, for example, in PECVD (Plasma Enhanced Chemical Vapor Deposition) chambers.

Figure 10:
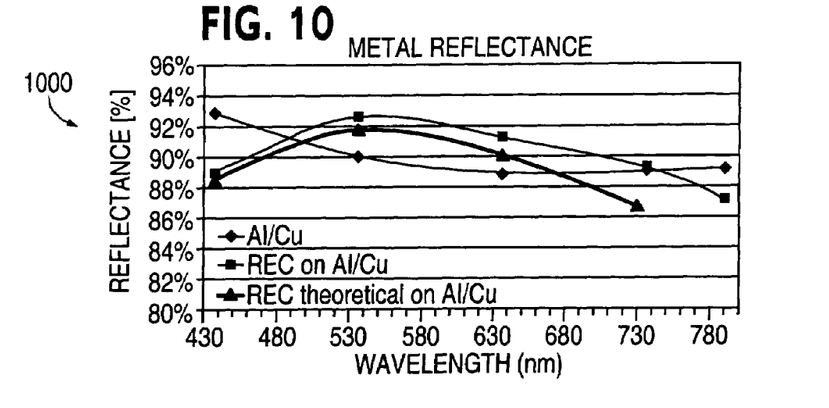
FIG. 10 shows an example plot of wavelength verses % reflectance for differing arrangements, such plot being useful in gaining a more thorough understanding/appreciation of the present invention.

The above-described Ti/REC arrangement may further enhance overall reflectance levels and/or reflectance levels for certain wavelengths. For understanding, FIG. 10 shows an example plot 1000 of wavelength verses % reflectance. As shown in FIG. 10, Al/Cu is a highly reflective metal layer with approximately a 90% reflectance (shown by the diamond-symbol line). In comparison, the triangular-symbol line shows a theoretical % reflectance of a base REC-Al/Cu arrangement, while the square-symbol line shows a measured % reflectance of the present embodiment's (FIGS. 7, 9's) REC-Al/Cu arrangement.

As can be gleaned from the FIG. 10 plot, the present embodiment's Ti/double-stack-REC layers increase the reflectance of the Al/Cu in the wavelength range of 485–745 nm while keeping all reliability requirements. That is, the present embodiment's REC layers improved pixel reflectance about 1% compared to the theoretical plotted line.

To summarize, the present embodiment's REC layer is unique over the disadvantageous example (FIGS. 6, 8) in using a Ti interface layer, and in using only double (i.e., double-stacked) versus triple layers (which represents a reduction in manufacturing complexity and cost). With the FIGS. 7/9 advantageous arrangement, reliability and a reflectance level/uniformity are improved, and problems concerning the aforementioned stress line emanation and reflective layer artifacts are reduced and/or avoided.

Figure 11:
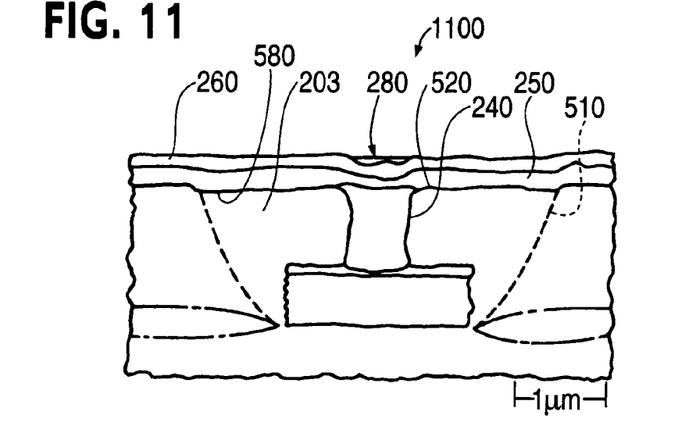
FIG. 11 illustrates a disadvantageous arrangement for comparison purposes with FIG. 12 showing an example second embodiment of the present invention, with all such FIGS. including magnified cross-sectional views of pixel mirror areas adjacent to an underlying plug.

Cap ILD Interfacing Layer:

For explanation, FIG. 11 (together with the indicated dimensional scale) represents a disadvantageous arrangement 1100 (for comparison purposes with FIG. 12) and includes a magnified cross-sectional view of areas adjacent to the underlying plug 240. Further discussion of FIG. 11 substantially parallels the prior FIGS. 5, 6 and 8 discussions, so redundant descriptions are omitted for sake of brevity. With the FIG. 11 disadvantageous arrangement, reliability is problematic as such arrangement is afflicted with the aforementioned stress line emanation and reflective layer artifacts.

A left-hand column of the following Table 2 lists an example processing flow for the FIG. 11 disadvantageous arrangement, while a right-hand column lists an example processing flow for another advantageous embodiment. (Bolded text may be used to highlight some important differences between the two.)

TABLE 2

| Disadvantageous Arrangement | Present Embodiment |
|---|---|
| MOS Processes: | MOS Processes: |
| Metal pattern created by dry plasma etch. | Metal pattern created by dry plasma etch. |
| ILD Dep. (PTEOS/Thick TEOS, CVD) | ILD Dep. (PTEOS/Thin TEOS CVD) |
|  | ILD CMP. |
|  | Cap ILD2 Dep. (Thin TEOS CVD) (CMP optional) |
| Dry etched vertical Via. | Dry etched vertical Via. |
| Tungsten fill of Via. | Tungsten fill of Via. |
| WEB (Tungsten Etch Back to Via Plug). | WEB (Tungsten Etch Back to Via Plug). |
| LCOS Processes: | LCOS Processes: |
| Pixel high reflective metal deposition. | Pixel high reflective metal deposition. |
| Pixel patterning. | Pixel patterning. |
| REC (Reflective Enhancement Coating). | REC (Reflective Enhancement Coating). |
| Reflectance check - Non uniform Reflectivity | Reflectance check - Uniform Reflectivity |

Figure 12:
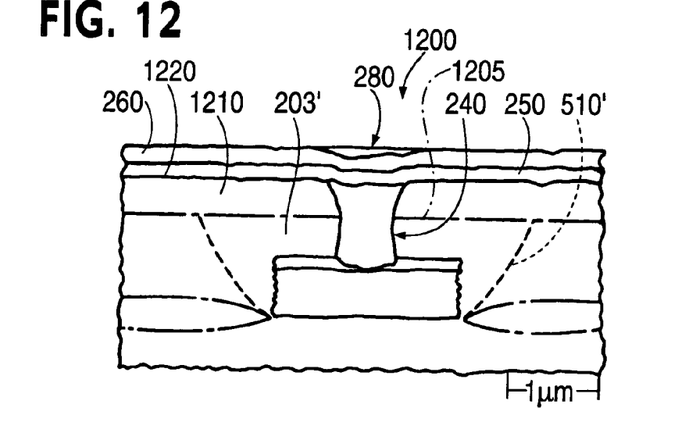

FIG. 12 (with the indicated dimensional scale) represents an example view 1200 of an example advantageous embodiment in accordance with the above Table 2 right-hand processing flow. Unnecessary/redundant discussion of ones of listed processes which may be familiar to those skilled in the art, or which may have been previously discussed, may be omitted for sake of brevity. That is, the following discussion tends to focus on the differences from the disadvantageous embodiment, and/or important processes/features of the present embodiment.

After formation of initial ILD layers (which may have the aforementioned stress lines 510) and before any etching of vertical vias, a planarization process (e.g., CMP) is applied to planarize a surface of the initial ILD layers. Since the CMP process is not selective/sensitive based upon ILD stress levels, good planarization and thus a substantially planar surface 1205 may be obtained. Next, a second or interfacing ILD layer 1210 is deposited (e.g., via thin TEOS CVD) onto the planarized initial ILD layer surface 1205.

While the planarized initial ILD layer 203' may still be afflicted with stress lines 510', the planarity of the such surface 1205 allows such underlying stresses not to be passed upwards to the capping or interface ILD layer 1210. That is, the cap or interface ILD layer 1210 may have a substantially mono-stressed (or non-stressed, or substantially consistently stressed (within a predetermined limit)) make-up throughout its body, or at least within an area defining a reflective unit (such as a pixel). The mono-stressed ILD layer 1210 is not afflicted with differing etch rates at differing areas thereof during plug etch back, because stress levels are pretty consistent there-through. Accordingly, etch-back of the tungsten fill material (to leave via plugs 240) will leave the mono-stressed ILD layer 1210 with a substantially planar surface 1220. The result is that stress line artifacts are minimized and/or eliminated within subsequently formed reflectance and REC layers.

The Implement of a thin Cap ILD layer just before the Via creation steps may thus exclude local stress differences, and as a result, provide improved flatness and uniformity of pixel reflectivity. Such layer may be summarized as a monostress Cap Inter Layer Dielectric (Cap ILD). Further, since such Cap ILD is formed on top of a planarized base ILD, i.e., is formed after base ILD planarization, the Cap ILD may be further or alternately summarized as a post-base-ILD-planarization Cap ILD.

Thus, the Cap ILD interface layer helps lessen/avoid the aforementioned differing stress line etch rates and/or emanation of artifacts into the subsequent Al/Cu layer, so as to result in a more uniform reflectance such as that shown in FIG. 3 (as opposed to FIG. 4). Thus, such Cap ILD layer may add significantly improved reliability success, and may be accomplished with negligible additional cost and with existing MOS technology/tools. Further, this embodiment enables high quality integration between MOS and LCOS technologies, and enables the production of optical devices using standard MOS technology.

Figure 13:
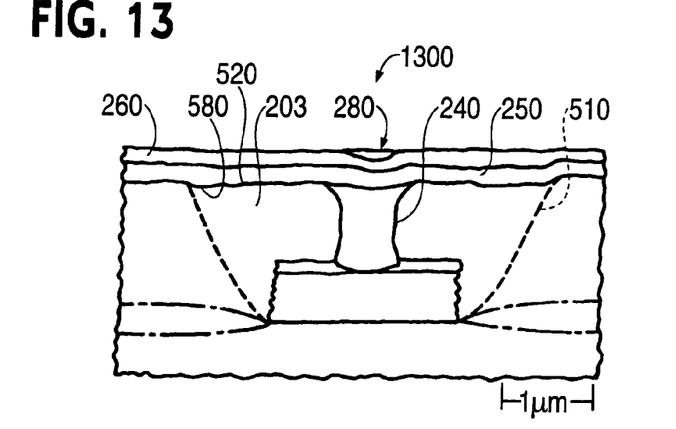
FIG. 13 illustrates a disadvantageous arrangement for comparison purposes with FIG. 14 showing an example third embodiment of the present invention, with all such FIGS. including magnified cross-sectional views of pixel mirror areas adjacent to an underlying plug.

Post-Plug-Etch Planarization of ILD:

For explanation, FIG. 13 (with the indicated dimensional scale) represents a disadvantageous arrangement 1300 (for comparison purposes with FIG. 14) and includes a magnified cross-sectional view of areas adjacent to the underlying plug 240. Further discussion of FIG. 13 substantially parallels the prior FIGS. 5, 6 and 8 discussions, so redundant descriptions are omitted for sake of brevity. With the FIG. 13 disadvantageous arrangement, reliability is problematic as such arrangement is afflicted with the aforementioned stress line emanation and reflective layer artifacts.

A left-hand column of the following Table 3 lists an example processing flow for the FIG. 13 disadvantageous arrangement, while a right-hand column lists an example processing flow for another advantageous embodiment. (Bolded text may be used to highlight some important differences between the two.)

TABLE 3

| Disadvantageous Arrangement | Present Embodiment |
| --- | --- |
| MOS Processes: | MOS Processes: |
| Metal pattern created by dry plasma etch. | Metal pattern created by dry plasma etch. |
| ILD Dep. (PTEOS/Thick TEOS, CVD) | ILD Dep. (PTEOS/Thin TEOS CVD) |
| ILD CMP. | ILD CMP. |
| Dry etched vertical Via. | Dry etched vertical Via. |
| Tungsten fill of Via. | Tungsten fill of Via. |
| WEB (Tungsten Etch Back to Via Plug). | WEB (Tungsten Etch Back to Via Plug). |
| LCOS Processes: | LCOS Processes: |
|  | Short ILD CMP |
| Pixel high reflective metal deposition. | Pixel high reflective metal deposition. |
| Pixel patterning. | Pixel patterning. |
| REC (Reflective Enhancement Coating). | REC (Reflective Enhancement Coating). |
| Reflectance check - Non uniform Reflectivity; 0.5 μm mirror/pixel plug hole | Reflectance check - Uniform Reflectivity; ~0.15 μm mirror/pixel plug hole |

Figure 14:
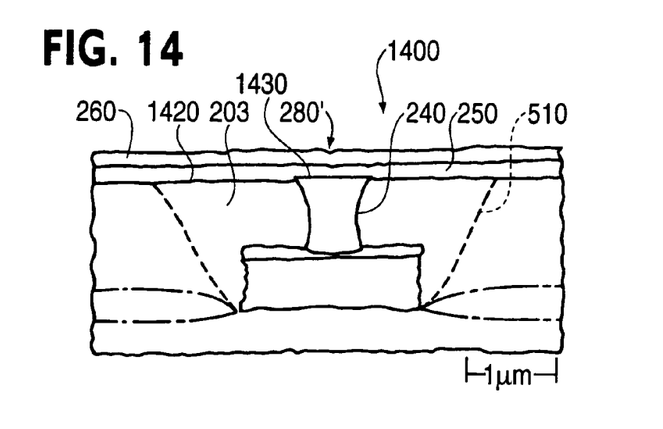

FIG. 14 (with the indicated dimensional scale) represents an example view 1400 of an example advantageous embodiment in accordance with the above Table 3 right-hand processing flow. Unnecessary/redundant discussion of ones of listed processes which may be familiar to those skilled in the art, or which may have been previously discussed, may be omitted for sake of brevity. That is, the following discussion tends to focus on the differences from the disadvantageous embodiment, and/or important processes/features of the present embodiment.

After formation of all ILD layers (which may have the aforementioned stress lines 510) and before deposition of any reflective layer 250, a short (e.g., 30–120 second) planarization process (e.g., CMP) may be applied to planarize a surface of the ILD layers. Since the CMP process is not selective/sensitive for the ILD portions based upon ILD stress levels, good planarization is achieveable and a substantially planar ILD surface 1420 may be obtained.

As mentioned previously, pixel holes 280 may show up in the reflective layer 250 and/or layers 203, due to distortions (non-planarities) that permeate upwards from underlying plug structure. Although accepted at today's resolutions, such "pixel hole defects" may become unacceptable and a potential limiter in future high resolution (smaller pixel) displays, as a pixel/hole size ratio may become unacceptable in terms of the effect on reflectance. That is, with smaller sized resolutions and pixels, the pixel hole may represent an unacceptable percentage of a pixel's overall area. The present post-plug-etch ILD planarization FIG. 14 embodiment may also minimize and/or eliminate pixel hole 280 distortions.

More particularly, an exposed plug 240 may also be planarized by the CMP process, so as to result in a more planarized plug surface 1430 that may be substantially planar to the ILD planar surface 1420. Since the surfaces 1420, 1430 are rendered substantially planar (with minimal or no plug-recess, there are no or only minimal plug distortions (non-planarities) that may permeate upwards to show up in the reflective layer 250 and/or layers 203.

Figure 15:
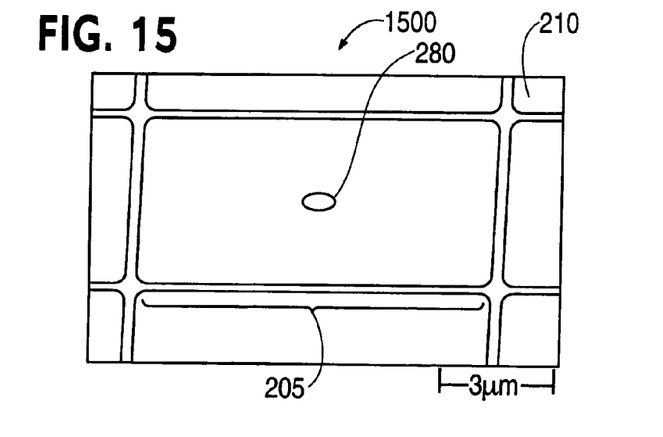
Figure 16:
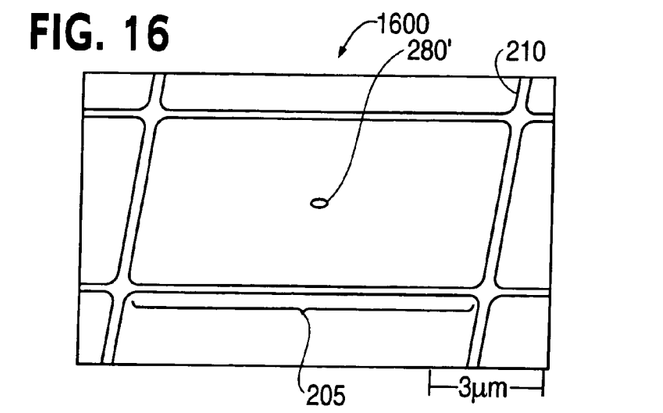
FIG. 16 illustrates a magnified view of an example advantageous pixel hole resultant from the FIG. 14 advantageous arrangement.

FIG. 15 shows a magnified view 1500 of an example pixel hole 280 that may be resultant from the FIG. 13 disadvantageous arrangement, whereas FIG. 16 shows a magnified view 1600 of a significantly reduced example pixel hole 280' that may be resultant form the present post-plug-etch ILD planarization FIG. 14 embodiment. Those skilled in the art will recognize that the greater the degree of coincidence between the planarized plug surface 1430 and planarized ILD surface 1420, the more the pixel hole 280' will be reduced (or even eliminated).

Thus, post-plug-etch ILD planarization may help lessen/avoid emanation of stress-line and/or pixel recess artifacts into the subsequent Al/Cu layer, so as to result in a more uniform reflectance such as that shown in FIG. 3 (as opposed to FIG. 4). Thus, post-plug-etch ILD planarization may add significantly improved reliability success, and may be accomplished with negligible additional cost and with existing MOS technology, tools, methods. Further, this embodiment enables high quality integration between MOS and LCOS technologies, and enables the production of optical devices using standard MOS technology. One alternative name for the present embodiment may be an ILD CMP post Tungsten Etch Back (WEB) embodiment.

Conclusion:

In beginning to conclude, reference in the specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment or component, it is submitted that it is within the purview of one skilled in the art to effect such feature, structure, or characteristic in connection with other ones of the embodiments and/or components.

Figure 17:
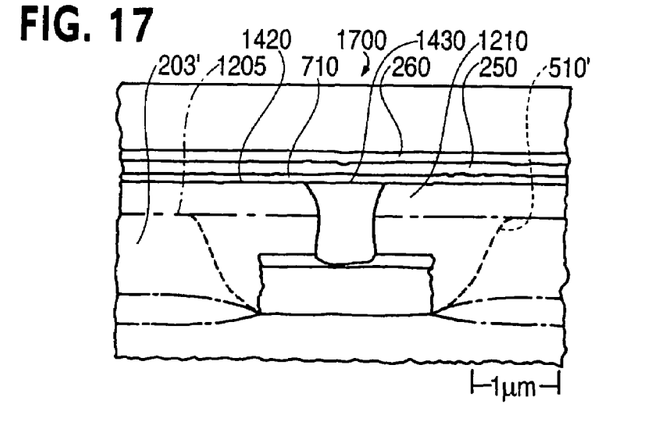
FIG. 17 illustrates a magnified cross-sectional view of pixel mirror areas adjacent to an underlying pixel metal interconnection and plug of an advantageous combination embodiment which may include structures/features of the first, second and third embodiments, with such views being useful in gaining a more thorough understanding/appreciation of the present invention.

For example, FIG. 17 illustrates an example embodiment that combines all of the aforementioned embodiments. More particularly, such embodiment includes an entombed ILD layer 203' (which may have stress lines 510') having a substantially (CMP) planarized upper ILD surface 1205, a second or interfacing (mono-stress) ILD layer 1210 having a substantially (CMP) planarized upper ILD surface 1420 and substantially (CMP) planarized plug surface 1430, and finally, a titanium (Ti) interfacing layer 710 disposed between a substrate and upper (e.g., Al/Cu) reflective layer portions 250. Redundant discussion of other ones of the FIG. 17 components that may have been previously discussed, are omitted for sake of brevity.

For ease of understanding, certain ones of the above method procedures may have been delineated as separate procedures; however, these separately delineated procedures should not be construed as necessarily order dependent in their performance, i.e., some procedures may be able to be performed in an alternative ordering, simultaneously, etc.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A method of forming a semiconductor device including a light reflective unit, the method comprising at least one of:
   disposing a titanium interface layer between a substrate and reflective layer portions of the light reflective unit;
   planarizing a base inter-layer dielectric (ILD) layer throughout the whole substrate to form a planar surface, and then depositing an interface ILD layer thereon before depositing a reflective layer of the light reflective unit.

2. A method as claimed in claim 1, comprising depositing a reflective enhancement coating (REC) of less than three stacked deposition layers on the reflective layer portions.

3. A method as claimed in claim 1, where the reflective layer portions include at least one of aluminum, copper, silver and gold material.

4. A method as claimed in claim 1, where the interface ILD layer is one of a non-stressed, mono-stressed and substantially consistently stressed interface ILD layer.

5. A method as claimed in claim 1, where the interface ILD layer is deposited using at least one of a tetraethylorthosilicate (TEOS); plasma TEOS (PTEOS), thick TEOS, chemical vapor deposition (CVD) and a plasma enhanced CVD (PECVD) deposition.

6. A method as claimed in claim 1, where the planarizing is performed using at least one of a mechanical and a chemical mechanical polish (CMP) planarization.

7. A method as claimed in claim 1, further comprising applying planarization to the plug-etched ILD to obtain post-plug-etch planarized ILD, before depositing the reflective layer of the light reflective unit.

8. A method as claimed in claim 7, where the planarization is performed using at least one of a mechanical and a chemical mechanical polish (CMP) planarization.

9. A method as claimed in claim 7, comprising planarizing to obtain at least one post-plug-etch planarized plug in the post-plug-etch planarized ILD, so as to have major planarized surfaces of the at least one post-plug-etch planarized plug and the post-plug-etch planarized ILD be substantially co-planar with one another.

10. The method of 2, wherein reflective enhancement coating (REC) consists of a silicon nitride layer on a silicon oxide layer.

* * * * *

UNITED STATES PATENT AND TRADEMARK OFFICE
CERTIFICATE OF CORRECTION

PATENT NO. : 7,399,699 B2
APPLICATION NO. : 11/073143
DATED : July 15, 2008
INVENTOR(S) : Ginsburg et al.

It is certified that error appears in the above-identified patent and that said Letters Patent is hereby corrected as shown below:

In column 11, at line 3, after "comprising", remove --at least one of--.

In column 11, at line 5, after "unit", insert --and--.

Signed and Sealed this

Third Day of March, 2009

JOHN DOLL
*Acting Director of the United States Patent and Trademark Office*